(12) United States Patent
Fukuda et al.

(10) Patent No.: US 8,570,459 B2
(45) Date of Patent: Oct. 29, 2013

(54) LIGHT DIFFUSING FILM, POLARIZING PLATE, LIQUID CRYSTAL DISPLAY DEVICE AND PRODUCTION METHOD OF LIGHT DIFFUSING FILM

(75) Inventors: Kenichi Fukuda, Kanagawa (JP); Jun Watanabe, Kanagawa (JP); Yusuke Ohashi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 104 days.

(21) Appl. No.: 13/200,707

(22) Filed: Sep. 29, 2011

(65) Prior Publication Data

US 2012/0081635 A1    Apr. 5, 2012

(30) Foreign Application Priority Data

Sep. 30, 2010 (JP) ................. 2010-223285

(51) Int. Cl.
*G02F 1/1335* (2006.01)
(52) U.S. Cl.
USPC .............................. 349/62; 349/64
(58) Field of Classification Search
USPC ...................... 349/64, 62; 359/599
See application file for complete search history.

(56) References Cited

U.S. PATENT DOCUMENTS

| | | | |
|---|---|---|---|
| 8,334,944 B2 * | 12/2012 | Joo et al. ................. | 349/64 |
| 2004/0022515 A1 * | 2/2004 | Sugiura et al. ............. | 385/146 |
| 2008/0192353 A1 * | 8/2008 | Nagahama et al. ........ | 359/599 |
| 2010/0238384 A1 * | 9/2010 | Tochigi et al. ............. | 349/96 |

FOREIGN PATENT DOCUMENTS

| | | |
|---|---|---|
| JP | 08-068997 A | 3/1996 |
| JP | 2000-075134 A | 3/2000 |
| JP | 2001-172403 A | 6/2001 |
| JP | 2006-208535 A | 8/2006 |

* cited by examiner

*Primary Examiner* — Nathanael R Briggs
(74) *Attorney, Agent, or Firm* — Jean C. Edwards; Edwards Neils PLLC

(57) ABSTRACT

A light diffusing film contains a thermoplastic resin as the main component and contains, in the thermoplastic resin, at least one kind of a light-transmitting particle having an average primary particle diameter of 3 to 10 μm, wherein the absolute value of the refractive index difference between the thermoplastic resin and the light-transmitting particle is from 0.01 to 0.06, wherein one surface has concavoconvex shape, the total haze value is from 15 to 30%, the internal haze value is from 5 to 25%, the surface haze value is from 5 to 20%, and the average film thickness is from 20 to 200 μm.

13 Claims, 5 Drawing Sheets

LIGHT DIFFUSING FILM, POLARIZING PLATE, LIQUID CRYSTAL DISPLAY DEVICE AND PRODUCTION METHOD OF LIGHT DIFFUSING FILM

CROSS-REFERENCE TO RELATED APPLICATIONS

This application claims priority from Japanese Patent Application No. 2010-223285, filed Sep. 30, 2010, the contents of which are hereby incorporated by reference in their entirety.

BACKGROUND OF THE INVENTION

1. Field of the Invention

The present invention relates to a light diffusing film, a polarizing plate, a liquid crystal display device, and a production method of a light diffusing film.

2. Description of the Related Art

In recent years, a liquid crystal display device (LCD) has been widely used because of its thinness, lightweight and low power consumption. The liquid crystal display device contains a liquid crystal cell and a polarizing plate. The polarizing plate is usually composed of a protective film and a polarizing film and is obtained by dyeing a polarizing film formed from a polyvinyl alcohol film with iodine, stretching the film, and stacking a protective film on both surfaces thereof. In a transmission-type liquid crystal display device, this polarizing plate is attached to both sides of a liquid crystal cell and one or more optically compensatory sheets are sometimes further disposed thereon.

A surface light source is used in the transmission-type liquid crystal display device. As the surface light source, a backlight type where a uniform surface light source is obtained by placing a member having a light diffusing function or a light collecting function, such as diffuser sheet or prism sheet, to intervene between a liquid crystal cell and a light emission source is widely used, and a cold-cathode tube (CCFL) or LED is used as the light emitting source. Also, some known LCDs are of a type where a light source is disposed in the edge part of a light guide plate and combined with a light diffusing sheet (light diffusing film), a prism sheet or the like to work as a surface light source (edge light type). In these types, the light diffusing sheet is generally used for converting a line light source or a point light source into a surface light source as described above.

Out of the constituent members for obtaining a surface light source, the light diffusing sheet is generally disposed between a backlight and a polarizing plate on the backlight side. By disposing the light diffusing sheet, reduction of luminance unevenness ascribable to a light source and surface uniformization of display characteristics are achieved and at the same time, luminance unevenness such as moire generated due to interference of incident light with a pixel in the liquid crystal cell can be suppressed.

In the conventional liquid crystal display device shown in FIG. 1 of JPA-2006-208535 (the term "JP-A" as used herein means an "unexamined published Japanese patent application"), when a prism sheet is disposed between the liquid crystal cell and the backlight source, moire is generated due to interference of the prism sheet with a pixel in the liquid crystal cell. In order to prevent such moire, Patent Document 1 discloses a method where in a liquid crystal display device using one or two prism sheets, a first diffuser sheet (sometimes referred to as a lower diffuser sheet) is disposed between a prism sheet and a light guide plate and a second diffuser sheet (sometimes referred to as an upper diffuser sheet) having a haze value of 60 to 80% is disposed between the prism sheet and a liquid crystal cell.

However, this method requires a second diffuser sheet, and light loss is produced due to reflection on the front or back surface of the new member. Also, in JPA-2006-208535, a light diffusing sheet having a haze value of 60 to 80% is used as the second diffuser sheet, but when a diffuser sheet having such a high haze value is used for light already transmitted through a prism sheet, the light causes backward scattering or wide-angle scattering and does not reach the front surface and therefore, the front luminance is reduced.

As a method for solving this problem, JP-A-8-068997 discloses a liquid crystal display device fabricated in the configuration above by omitting the second light diffusing sheet and using two prism sheets, wherein a predetermined angle is imparted to the groove direction of the prism sheet and the repeating direction of pixels in the liquid crystal cell and at the same time, those two prism sheets are disposed by arranging their groove directions to run at right angles to one another.

The present inventors have studied to remove a light diffusing sheet by using the method above and found that in this method, the moire observed at the front is surely reduced, but when viewed from a direction orthogonal to the groove of the prism sheet and tilted to the plane direction of the prism sheet from the normal line of the prism sheet, a stripe-like luminance unevenness attributable to the prism groove is observed in an oblique direction (oblique luminance unevenness), impairing the image quality.

The above-described second diffuser sheet is effective in eliminating such a stripe-like oblique luminance unevenness, but the problem of reduction in front luminance re-emerges.

With respect to preventing the interface reflection by the introduction of a second diffuser sheet, attempts are being recently made to reduce the thickness of the display device by decreasing the number of members of a liquid crystal display device or for realizing low power consumption, to decrease the number of fluorescent lamps used as the light source by preventing reflection on the interface of members and thereby effectively utilizing light. Following this trend, it is being studied to combine a light diffusing sheet and a backlight-side polarizing plate.

For example, JP-A-2000-075134 has proposed a light diffusing and polarizing plate where a light diffusing layer formed of a photocurable resin having dispersed and incorporated therein porous amorphous particles and spherical particles and imparted with surface concavoconvex giving a haze of 60% or more is stacked, and it is disclosed that thanks to this polarizing plate, even when a light diffusing sheet is removed, moire generated due to interference of a prism sheet with a pixel in the liquid crystal cell can be prevented.

However, this method uses a diffuser sheet having a high haze value and therefore, the problem of reduction in front luminance due to the above-described backward scattering or wide-angle scattering of light is unsolved.

Also, in the method above, a light diffusing layer is stacked by coating and curing a photocurable resin containing particles on a polarizing plate, and a step of stacking the light diffusing layer must be provided after producing a polarizing plate, which brings about a new problem that the productivity is low.

On the other hand, JP-A-2001-172403 has proposed a production method of a light diffusing film, comprising a step of casting a dope containing fine particles on a support, and it is disclosed that according to this method, a light diffusing film endowed with good surface quality and high productivity can be produced. Use of this method is successful to a certain extent in solving the problem of productivity, but since a light scattering technique by a high haze is fundamentally used for the reduction of luminance unevenness, the problem of reduction in front luminance is not yet solved.

Summarizing these, a light diffusing film ensuring that the front luminance is high, the moire control effect is excellent, luminance unevenness in the oblique direction or the like is not observed, a display device mounted with the film is excellent in the image quality, and the productivity is high, has been heretofore unknown, and a light diffusing film having these characteristics and a production method thereof are being demanded.

SUMMARY OF THE INVENTION

An object of the present invention is to provide a light diffusing film ensuring that the front luminance is high, the moire control effect is excellent, luminance unevenness in the oblique direction or the like is not observed, a display device mounted with the film is excellent in the image quality, and the productivity is high.

The above-described object is attained by the following configurations.

(1) A light diffusing film comprising a thermoplastic resin as the main component and containing, in said thermoplastic resin, at least one kind of a light-transmitting particle having an average primary particle diameter of 3 to 10 μm, wherein the absolute value of the refractive index difference between the thermoplastic resin and the light-transmitting particle is from 0.01 to 0.06, one surface has concavoconvex shape, the total haze value is from 15 to 30%, the internal haze value is from 5 to 25%, the surface haze value is from 5 to 20%, and the average film thickness is from 20 to 200 μm.

(2) The light diffusing film as described in (1) above, wherein the total haze value is from 20 to 30%, the internal haze is from 10 to 20%, and the surface haze is from 10 to 20%.

(3) The light diffusing film as described in (1) or (2) above, wherein the absolute value of the refractive index difference between the thermoplastic resin and the light-transmitting particle is from 0.01 to 0.03.

(4) The light diffusing film as described in any one of (1) to (3) above, wherein the average primary particle diameter of the light-transmitting particle is from 5 to 8 μm.

(5) The light diffusing film as described in any one of (1) to (4) above, wherein the arithmetic average roughness Ra and the average spacing between peaks over the evaluation length Sm, based on JIS B0601, of the surface concavoconvex shape satisfy the following (formula 1) and (formula 2), respectively:

$$0.10\ \mu m \leq Ra \leq 0.30\ \mu m \quad \text{(formula 1)}$$

$$50\ \mu m \leq Sm \leq 200\ \mu m \quad \text{(formula 2)}$$

(6) The light diffusing film as described in any one of (1) to (4) above, wherein the arithmetic average roughness Ra and the average spacing between peaks over the evaluation length Sm, based on JIS B0601, of the surface concavoconvex shape satisfy the following (formula 1') and (formula 2'), respectively:

$$0.16\ \mu m \leq Ra \leq 0.24\ \mu m \quad \text{(formula 1')}$$

$$60\ \mu m \leq Sm \leq 130\ \mu m \quad \text{(formula 2')}$$

(7) The light diffusing film as described in any one of (1) to (6) above, wherein the thermoplastic resin is a cellulose ester.

(8) The light diffusing film as described in any one of (1) to (7) above, wherein the light diffusing film has a region substantially absent of the light-transmitting particle having an average primary particle diameter of 3 to 10 μm and the region has a thickness of 5 to 30 μm in the thickness direction from the surface having concavoconvex shape.

(9) The light diffusing film as described in (8) above, wherein the light-transmitting particle having an average primary particle diameter of 3 to 10 μm is substantially absent in the region of 0 to 20 μm in the thickness direction from the surface opposite to the surface having concavoconvex shape.

(10) The light diffusing film as described in any one of (1) to (9) above, which is used for a polarizing plate protective film on the backlight side of a liquid crystal display device.

(11) A polarizing plate having a polarizing film and a protective film provided on at least one side of the polarizing film, wherein the protective film is the light diffusing film described in any one of (1) to (10) above.

(12) An image display device having the light diffusing film described in any one of (1) to (10) above or the polarizing plate described in (11).

(13) A liquid crystal display device comprising:
a liquid crystal display element and
a backlight structure for irradiating the liquid crystal display element,
wherein the backlight structure includes at least a diffuser plate and two prism sheets being disposed between the diffuser plate and the liquid crystal element and having a large number of fine prism grooves on the liquid crystal display element-side surface,
the angle between the groove direction of the prism groove of the two prism sheets and the repeating direction of pixels in the liquid crystal element is 4 to 86°,
the two prism sheets are disposed by arranging the groove directions of prism grooves to run at right angles to one another, and
the light diffusing film described in any one of (1) to (10) above or the polarizing plate described in (11) is provided between said two prism sheets and the liquid crystal element.

(14) A method for producing the light diffusing film described in any one of (1) to (10) above, comprising simultaneously or sequentially casting, in order, on a support to form a film:
a light-transmitting particle-containing dope A containing at least one kind of a thermoplastic resin and at least one kind of a light-transmitting particle having an average primary particle diameter of 3 to 10 μm, wherein the absolute value of the refractive index difference between the thermoplastic resin and the light-transmitting particle is from 0.01 to 0.06, and
a surface profile-adjusting dope B containing at least one kind of a thermoplastic resin and substantially free from a particle having a particle diameter of 1 μm or more, the surface profile-adjusting dope being lower in the concentration of the thermoplastic resin than the light-transmitting particle-containing dope.

(15) The production method of a light diffusing film as described in (14) above, wherein a dope C containing at least one kind of a thermoplastic resin and substantially free from a particle having a particle diameter of 1 μm or more, the light-transmitting particle-containing dope A and the surface profile-adjusting dope B are, in order, simultaneously or sequentially cast on a support to form a film.

The light diffusing film of the present invention ensures high white luminance in front, uniform luminance on screen, excellent image quality without moire or stripe-like luminance unevenness observed in the oblique direction, and good mass productivity.

Also, the polarizing plate using the light diffusing film of the present invention as a protective film is excellent in optical performance, allows for mass supply at a low cost, and contributes to reduction in the thickness of an image display device.

DESCRIPTION OF REFERENCE NUMERALS AND SIGNS

Figure 1:
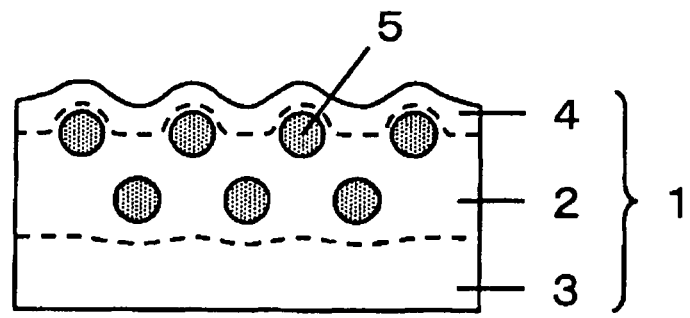
FIG. 1 is a cross-sectional view showing one example of the light diffusing film of the present invention.

1 denotes Light diffusing film, 2 denotes Base layer, 3 denotes Surface layer, 4, 4a, 4b denote Surface layer, 5 denotes Light-transmitting particle, 11 denotes Stirrer, 12 denotes Transfer pump, 13 denotes Filter, 14 denotes Stock tank, 15a denotes Transfer pump of casting solution for back layer, 15b denotes Transfer pump of casting solution for base layer, 15c denotes Transfer pump of casting solution for surface layer, 15d denotes Transfer pump of casting solution for outermost surface layer, 16a denotes Injection pump of additives (solvent, matting agent, etc.), 16c denotes Injection pump of additives (solvent, light-transmitting particle, etc.), 16d denotes Injection pump of additives (solvent, light-transmitting particle, etc.), 17 denotes Casting die, 18 denotes Casting band, 19 denotes Decompression chamber, 20 denotes Casting drum, 30 denotes Casting die, 32 denotes Manifold, 33 denotes Feed block, 41 denotes Light source, 42 denotes Fluorescent tube, 43 denotes Lower diffuser sheet, 44 denotes Light collecting sheet, 45 denotes Upper diffuser sheet, 46 denotes Polarizing plate, 47 denotes Liquid crystal cell, 48 denotes Base plate, 49 denotes Light diffusing film.

DETAILED DESCRIPTION OF THE INVENTION

The present invention is described in detail below. Incidentally, in the description of the present invention, the numerical range expressed using "from (numerical value) to (numerical value)" means the range including the numerical values set forth before and after "to" as the lower limit value and the upper limit value, respectively. Also, in the present invention, the terms "polarizing film" and "polarizing plate" are used by making a distinction therebetween, and the "polarizing plate" means a laminate having, on at least one surface of a "polarizing film", a transparent protective film for protecting the polarizing film. Also, the error allowed in the technical field to which the present invention belongs, such as technical fields of polymer film, polarizing plate and image display device, is also allowed with respect to the numerical value range set forth in the description of the present invention.

SUMMARY OF THE INVENTION

The light diffusing film of the present invention comprises a thermoplastic resin as the main component and contains, in the thermoplastic resin, at least one kind of a light-transmitting particle having an average primary particle diameter of 3 to 10 μm, wherein the absolute value of the refractive index difference between the thermoplastic resin and the light-transmitting particle is from 0.01 to 0.06, wherein one surface has concavoconvex shape, the total haze value is from 15 to 30%, the internal haze value is from 5 to 25%, the surface haze value is from 5 to 20%, and the average film thickness is from 20 to 200 μm.

The front luminance nearly correlates to the haze, and as the haze is higher, the front luminance is lower. The luminance unevenness in front, such as moire generated due to interference of a prism sheet and a pixel in the liquid crystal cell, becomes less obstructive as the haze is higher. On the other hand, the present inventors have noticed that the stripe-like luminance unevenness as a problem to be solved by the present invention, which is attributable to a prism sheet and observed in the oblique direction, does not necessarily become less obstructive as the haze is higher, and further made studies, as a result, a method capable of eliminating the oblique luminance unevenness despite low haze has been found. The present invention has been accomplished based on this finding.

More specifically, it has been found that when surface scattering and internal scattering are introduced while reducing the total haze value to 15 to 30%, the oblique luminance unevenness can be made less obstructive more efficiently (with respect to haze) than by surface scattering or internal scattering alone. That is, surface scattering and internal scattering offset the inefficiency at eliminating the oblique luminance unevenness by each other.

Incident light is partially diffracted by the surface unevenness of the light scattering film, and the diffracted light and the undiffracted straight-traveling light are mixed, whereby the luminance difference ascribable to the incident position is relieved and the luminance unevenness is reduced. Accordingly, for increasing the effect of eliminating the luminance unevenness, it is necessary to decrease the straight-traveling light and increasing the diffracted light. Out of diffracted light components, a light component having a relatively large diffraction angle is recognized as haze.

On the other hand, in the stripe-like luminance unevenness as a problem to be solved by the present invention, which is attributable to a prism sheet and observed in the oblique direction, the gap between stripes is relatively narrow, and diffraction at an angle low enough to let the diffracted light be unrecognized as haze is most effective for eliminating the luminance unevenness.

In the light diffusing film comprising a thermoplastic resin as the main component and formed of a light-transmitting particle, thanks to high viscosity of the film-forming dope, the light diffusing film surface corresponding to a portion where light-transmitting particles are densely present or a portion where light-transmitting particles are sparsely present is flat, and light incident on the light diffusing film surface travels straight without being diffracted. The straight-traveling incident light can be diffracted by introducing internal scattering into the flat part.

<Configuration of Liquid Crystal Display Device>

Figure 8:
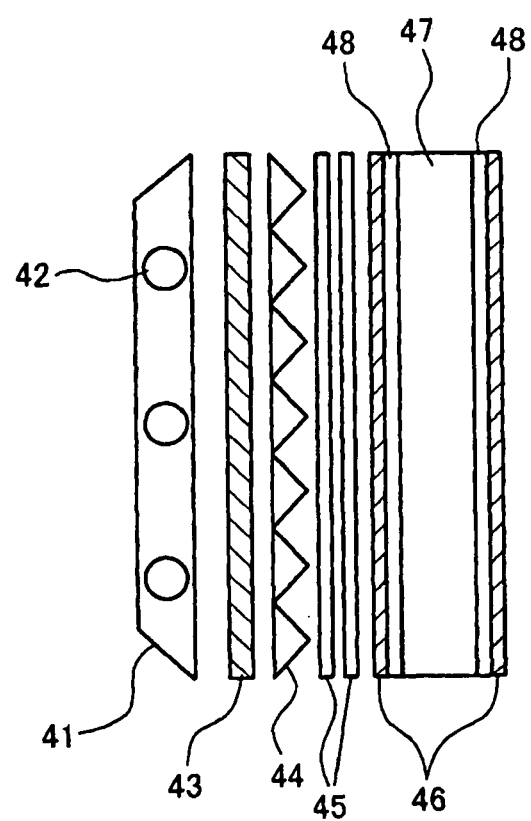
FIG. 8 is a schematic view showing one example of the conventional liquid crystal display device.

One example of the configuration of the conventional liquid crystal display device is, as shown in FIG. 8, [light source 41/light guide plate (fluorescent tube) 42/lower diffuser sheet (lower diffuser plate) 43/prism sheet 44/upper diffuser sheet (upper diffuser plate) 45/liquid crystal panel (liquid crystal display element) (lower polarizing plate 46/substrate 48/liquid crystal cell 47/upper polarizing plate 46)] from the light source side. The light source 41, the light guide plate 42, the lower diffuser sheet 43 and the prism sheet 44 are collectively referred to as a backlight structure. The lower diffuser sheet is an optical sheet having strong light diffusibility for reducing mainly the in-plane luminance unevenness of the backlight structure; the light collecting sheet is an optical sheet for collecting diffused light to the front direction of the liquid crystal display device (the normal direction of the display device plane); and the upper diffuser sheet is an optical sheet for reducing moire that is generated due to a prism sheet as the light collecting sheet or a periodic structure such as pixel in the liquid crystal cell, and further reducing the in-plane luminance unevenness that cannot be removed by the lower diffuser sheet.

Figure 9:
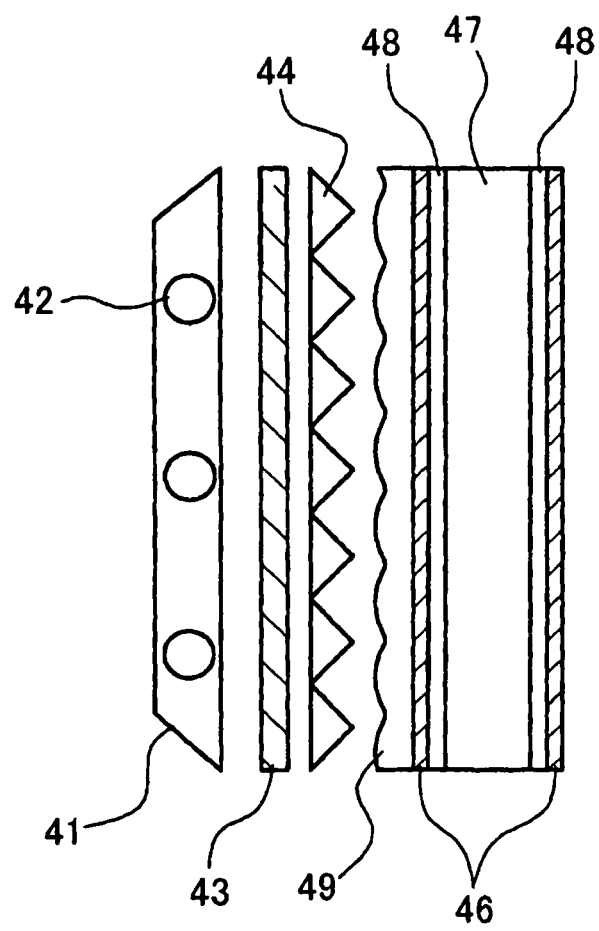
FIG. 9 is a schematic view showing one example of the liquid crystal display device of the present invention.

In the liquid crystal display device of the present invention, as shown in FIG. 9, in place of the upper diffuser sheet, a protective film of the lower polarizing plate is imparted with light diffusibility (light diffusing film 49) and designed to bring out the performance equal to or greater than the upper diffuser sheet.

In FIG. 9, only one prism sheet 44 is illustrated, but the liquid crystal display device may have two prism sheets. In a preferred embodiment of the present invention, the liquid crystal display device has two prism sheets, the angle between the groove direction of the prism groove of two prism sheets and the repeating direction of pixels in the liquid crystal element is from 4 to 86°, and two prism sheets are disposed by arranging the groove directions of prism grooves to run at right angles to one another.

In particular, the light diffusing film of the present invention is designed to have low haze, thereby ensuring sufficient front luminance, and combined with a specific prism sheet configuration, so that the moire in the front direction and the luminance unevenness in the oblique direction can be prevented.

In some liquid crystal display devices, a brightness enhancing film (for example, DBEF, produced by 3M) is used directly below the lower polarizing plate and when a light diffusing film is used for a protective film of the lower polarizing plate, depolarization occurs to incur impairment of the brightness enhancing performance. However, in the liquid crystal display device of the present invention, a light diffusing film reduced in the wide-angle scattering component causing large depolarization is used, so that impairment of the brightness enhancing performance can be remarkably reduced.

<Configuration of Light Diffusing Film>

The light diffusing film of the present invention comprises a thermoplastic resin and contains, in the thermoplastic resin, a light-transmitting particle having an average primary particle diameter of 3 to 10 μm, wherein the absolute value of the refractive index difference between the thermoplastic resin and the light-transmitting particle is from 0.01 to 0.06.

<Material of Light Diffusing Film>

[Thermoplastic Resin]

The main component (a material accounting for 51 to 99 mass % of the solid content of the light diffusing film) constituting the light diffusing film of the present invention is a thermoplastic resin, and specific examples thereof include a cellulose ester (preferably a cellulose acylate, e.g., triacetyl cellulose (cellulose triacetate), diacetyl cellulose, propionyl cellulose, butyryl cellulose, acetylbutyryl cellulose (cellulose acetate butyrate), acetyl propionyl cellulose), a nitrocellulose, a polyamide, a polycarbonate, a polyester (e.g., polyethylene terephthalate, polyethylene naphthalate, poly-1,4-cyclohexanedimethylene terephthalate, polyethylene-1,2-diphenoxyethane-4,4'-dicarboxylate, polybutylene terephthalate), a polystyrene (e.g., syndiotactic polystyrene), a polyolefin (e.g., polypropylene, polyethylene, polymethylpentene, polycycloalkane), a polysulfone, a polyethersulfone, a polyallylate, a polyetherimide, a polymethyl methacrylate, a polyether ketone, a norbornene-based resin (ARTON, trade name, produced by JSR), an amorphous polyolefin (ZEONEX, trade name, produced by ZEON Corporation), and a (meth)acrylic resin (ACRYPET VRL20A, trade name, produced by Mitsubishi Rayon Co., Ltd., and ring structure-containing acrylic resins described in JP-A-2004-70296 and JP-A-2006-171464).

Among these, a cellulose ester (preferably a cellulose acylate, more preferably cellulose triacetate), a polycarbonate and a modified polymethyl methacrylate are preferred, a cellulose ester and a polycarbonate are more preferred, and a cellulose ester is most preferred.

In the case of using the light diffusing film of the present invention for a polarizing plate, the balance of hydrophobicity/hydrophilicity of the film, the lamination property to a vinyl alcohol-based film of the polarizing film, and the uniformity of optical properties in the entire film plane are important, and the thermoplastic resin as the main component is preferably a cellulose acylate, more preferably triacetyl cellulose, diacetyl cellulose, acetylbutyryl cellulose or propionyl cellulose.

The cellulose acylate which can be suitably used in the present invention is preferably a carboxylic acid ester having a total carbon number of 2 to 22 of cellulose. Examples thereof include an alkylcarbonyl ester of cellulose, an alkenylcarbonyl ester of cellulose, a cycloalkylcarbonyl ester of cellulose, an aromatic carbonyl ester of cellulose, and an aromatic alkylcarbonyl ester of cellulose, and these esters may further have a substituted group.

The acyl group having a carbon number of 2 to 22 in the cellulose acylate for use in the present invention may be an aliphatic acyl group or an aromatic acyl group and is not particularly limited. Preferred examples of the acyl group include an acetyl group, a propionyl group, a butanoyl group, a heptanoyl group, a hexanoyl group, an octanoyl group, a cyclohexanecarbonyl group, an adamantanecarbonyl group, a phenylacetyl group, a benzoyl group, and a naphthylcarbonyl group. Among these acyl groups, more preferred are an acetyl group, a propionyl group, a butanoyl group, a pentanoyl group, a hexanoyl group, a cyclohexanecarbonyl group, a phenylacetyl group, a benzoyl group and a naphthylcarbonyl group.

The cellulose acylate suitably used in the present invention is preferably a cellulose acylate where the substitution degrees to the hydroxyl group of cellulose satisfy the following mathematical formulae (7) and (8):

$$2.3 \leq SA' + SB' \leq 3.0 \qquad \text{Mathematical Formula (7)}$$

$$0 \leq SA' \leq 3.0 \qquad \text{Mathematical Formula (8)}$$

wherein SA' represents the substitution degree of the acetyl group substituting for the hydrogen atom of the hydroxyl group of cellulose, and SB' represents the substitution degree of the acyl group having a carbon number of 3 to 22 and substituting for the hydrogen atom of the hydroxyl group of cellulose.

The β-1,4-bonded glucose unit constituting cellulose has a free hydroxyl group at the 2-position, 3-position and 6-position. The cellulose acylate is one where these hydroxyl groups are partially or entirely esterified with an acyl group. The acyl substitution degree means a ratio in which the hydroxyl group is esterified at each of the 2-position, 3-position and 6-position (100% esterification at each position corresponds to a substitution degree of 1). In the present invention, the sum total (SA'+SB') of the substitution degrees is more preferably from 2.6 to 3.0, still more preferably from 2.70 to 3.00.

Also, SA' is more preferably from 1.4 to 3.0, still more preferably from 2.3 to 2.9.

In the present invention, the carbon number of the acyl group having a carbon number of 3 to 22 and substituting for the hydrogen atom of the hydroxyl group of cellulose is preferably 3 or 4. The substitution degree when substituted by an acyl group having such a carbon number preferably further satisfies, in addition to mathematical formulae (7) and (8) above, the following mathematical formula (9) at the same time:

$$0 \leq SB'' \leq 1.2 \quad \text{Mathematical Formula (9)}$$

wherein SB" represents the substitution degree of the acyl group having a carbon number of 3 or 4 and substituting for the hydrogen atom of the hydroxyl group of cellulose.

The substitution degree is obtained by calculation after measuring the bonding degree of a fatty acid bonded to the hydroxyl group in cellulose. As for the measuring method, the measurement can be performed in accordance with ASTM-D817-91 and ASTM-D817-96. Also, the substituted state of the acyl group on the hydroxyl group is measured by the $^{13}C$ NMR method.

In the light diffusing film of the present invention, the polymer component constituting the film is preferably composed of substantially a thermoplastic resin, more preferably a cellulose acylate satisfying mathematical formulae (7) and (8). The "substantially" means 55 mass % or more (preferably 70 mass % or more, more preferably 80 mass % or more) of all polymer components. One cellulose acylate may be used alone, or two or more kinds of cellulose acylates may be used in combination.

The polymerization degree of the cellulose acylate which is preferably used in the present invention is, in terms of the viscosity average polymerization degree, preferably from 200 to 700, more preferably from 230 to 550, still more preferably from 230 to 350, yet still more preferably from 240 to 320. The average polymerization degree can be measured by the intrinsic viscosity method of Uda, et al. (Kazuo Uda and Hideo Saito, *JOURNAL OF THE SOCIETY OF FIBER SCIENCE AND TECHNOLOGY, JAPAN*, Vol. 18, No. 1, pp. 105-120 (1962)). This is described in detail in JP-A-9-95538.

The number average molecular weight Mn of the cellulose acylate is preferably from $7 \times 10^4$ to $25 \times 10^4$, more preferably from $8 \times 10^4$ to $15 \times 10^4$. The ratio to the mass average molecular weight Mw of the cellulose acylate, Mw/Mn, is preferably from 1.0 to 5.0, more preferably from 1.0 to 3.0. The average molecular weight and molecular weight distribution of the cellulose acylate can be measured using a high-performance liquid chromatography. Using the results obtained, Mn and Mw can be calculated and then, Mw/Mn can be calculated.

[Light-Transmitting Particle]

In addition to the thermoplastic resin, the light diffusing film of the present invention contains, in the thermoplastic resin, at least one kind of a light-transmitting particle having an average primary particle diameter of 3 to 10 μm, wherein the absolute value of the refractive index difference between the thermoplastic resin and the light-transmitting particle is from 0.01 to 0.06.

The light-transmitting particle preferably has a nearly spherical shape. The average primary particle diameter of the light-transmitting particle is from 3 to 10 μm and by specifying the average primary particle diameter to this range, scattering in the oblique direction can be promoted while suppressing haze and the oblique luminance unevenness can be eliminated. The average primary particle diameter of the light-transmitting particle is preferably from 5 to 10 μm, more preferably from 5 to 8 μm.

The refractive index of the light-transmitting particle is preferably from 1.40 to 1.65, more preferably from 1.45 to 1.60, and most preferably from 1.45 to 1.55.

In the present invention, the absolute value of the refractive index difference between the light-transmitting particle and the thermoplastic resin (the portion excluding the light-transmitting particle of the light diffusing film) is from 0.01 to 0.06, preferably from 0.01 to 0.04, more preferably from 0.01 to 0.03. By specifying the refractive index difference between the light-transmitting particle and the thermoplastic resin to this range, similarly to the above, scattering in the oblique direction can be promoted while suppressing scattering of light perpendicularly incident on the film surface.

The light-transmitting particle is preferably blended in the light-transmitting particle-containing dope in an amount of 3 to 30 parts by mass, more preferably from 4 to 25 parts by mass, still more preferably from 5 to 15 parts by mass, per 100 parts by mass of the thermoplastic resin. By setting the amount used to this range, surface scattering and internal scattering can be appropriately controlled.

The density of the light-transmitting particle is preferably from 0.1 to 10.0 $g/m^2$, more preferably from 0.2 to 8.0 $g/m^2$, and most preferably from 0.3 to 5.0 $g/m^2$, per unit area. By controlling the amount used to this range, desired light scattering property can be obtained.

As the light-transmitting particle, both an inorganic particle and an organic particle can be used.

Examples of the inorganic particle include silica and alumina. These include, for example, spherical silica and spherical alumina produced by Micron Inc.

Examples of the organic particle include an acrylstyrene-based resin, a polymethyl methacrylate resin, a silicon-based resin, a polystyrene-based resin, a polycarbonate resin, a benzoguanamine resin, a melamine-based resin, a polyolefin-based resin, a polyester-based resin, a polyamide-based resin, a polyimide-based resin, and a polyethylene fluoride-based resin.

As for the commercially available product, examples of the styrene or acrylic resin include Chemisnow MX Series and SX Series produced by Soken Chemical & Engineering Co., Ltd., and Techpolymer produced by Sekisui Plastics Co., Ltd.; examples of the benzoguanamine-based resin include EPOSTAR produced by Nippon Shokubai Co., Ltd.; and examples of the melamine-based resin include OPTBEADS produced by Nissan Chemicals Industries, Ltd.

In view of, for example, adherence to the thermoplastic resin and interfacial separation or dropout due to humidity or heat in the light diffusing film, an organic particle having expansion coefficient characteristics close to that of the thermoplastic resin is preferably used. In the present invention, above all, the light-transmitting particle is preferably a nearly spherical resin particle.

Also, from the same standpoint, among the organic particles, a polymethyl methacrylate resin particle and an acrylstyrene-based resin particle are preferred, and as the acrylstyrene-based resin particle, a polymethyl methacrylate-styrene copolymer particle is particularly preferred.

As described above, when the light diffusing film of the present invention is used as a protective film for a polarizing plate, the thermoplastic resin working out to the main component is preferably a cellulose acylate. In the case of using a cellulose acylate as the main component, the organic particle is most preferably a polymethyl methacrylate resin particle, because its swelling ratio characteristics with heat or humidity are close to that of the cellulose acylate and in addition, a refractive index difference best for elimination of luminance unevenness can be introduced.

The light diffusing film of the present invention may contain a material other than the above-described thermoplastic resin and light-transmitting particle.

[Plasticizer]

In the present invention, a plasticizer may be added so as to impart flexibility to the light diffusing film and enhance the dimensional stability and moisture resistance.

In the case of using a cellulose acylate as the material of the light diffusing film, above all, a plasticizer having an octanoll-water partition coefficient (log P value) of 0 to 10 is preferably used. Use of a plasticizer having an octanol/water partition coefficient in this range is preferred, because when the log P value of the compound is 10 or less, compatibility with the cellulose acylate is good and the film is free from troubles such as powdery bloom, and when the log P value is 0 or more, hydrophilicity is kept from not becoming excessively high and a problem such as impairment of water resistance of the cellulose acylate film is hardly caused. The log P value is more preferably from 1 to 8, still more preferably from 2 to 7.

The octanol/water partition coefficient (log P value) can be measured by a shake flask method described in Japanese Industrial Standards (JIS) Z7260-107 (2000). In place of actual measurement, the octanollwater partition coefficient (log P value) can be also estimated by a chemical computational method or an empirical method. Examples of the computational method which is preferably used include the Crippen's fragmentation method [see, *J. Chem. Inf. Comput. Sci.*, Vol. 27, page 21 (1987)], the Viswanadhan's fragmentation method [see, *J. Chem. Inf. Comput. Sci.*, Vol. 29, page 163 (1989)], and the Broto's fragmentation method [see, *Eur. J. Med. Chem.-Chim. Theor.*, Vol. 19, page 71 (1984)]. Among these, the Crippen's fragmentation method is more preferred. In the case where the log P value of a certain compound varies depending on the measuring method or computational method, whether the compound is within the range of the present invention or not is preferably judged by the Crippen's fragmentation method.

The plasticizer which is preferably added includes low molecular to oligomer compounds having a molecular weight of approximately from 190 to 5,000 that is within the range above of physical properties, and, for example, a phosphoric acid ester, a carboxylic acid ester or a polyol ester is used.

Examples of the phosphoric acid ester include triphenyl phosphate (TPP), tricresyl phosphate, cresyl diphenyl phosphate, octyl diphenyl phosphate, biphenyldiphenyl phosphate, trioctyl phosphate and tributyl phosphate, with triphenyl phosphate and biphenyldiphenyl phosphate being preferred.

As the carboxylic acid ester, a phthalic acid ester and a citric acid ester are representative. Examples of the phthalic acid ester include dimethyl phthalate, diethyl phthalate, dibutyl phthalate, dioctyl phthalate, diphenyl phthalate and diethyl hexyl phthalate. Examples of the citric acid ester include O-acetyl triethyl citrate, O-acetyl tributyl citrate, acetyl triethyl citrate, and acetyl tributyl citrate.

These preferred plasticizers are a liquid at 25° C. except for TPP (melting point: about 50° C.), and their boiling point is 250° C. or more.

Other examples of the carboxylic acid ester include butyl oleate, methyl acetyl ricinoleate, dibutyl sebacate and various trimellitic acid esters. Examples of the glycolic acid ester include triacetin, tributyrin, butyl phthalyl butyl glycolate, ethyl phthalyl ethyl glycolate, methyl phthalyl ethyl glycolate, butyl phthalyl butyl glycolate, methyl phthalyl methyl glycolate, propyl phthalyl propyl glycolate, butyl phthalyl butyl glycolate, and octyl phthalyl octyl glycolate.

In addition, plasticizers described, for example, in JP-A-5-194788, JP-A-60-250053, JP-A-4-227941, JP-A-6-16869, JP-A-5-271471, JP-A-7-286068, JP-A-5-5047, JP-A-11-80381, JP-A-7-20317, JP-A-8-57879, JP-A-10-152568 and JP-A-10-120824 may be also preferably used. In these patent publications, not only examples of the plasticizer but also many preferred embodiments of their utilization methods or properties are described, and these may be preferably employed also in the present invention.

Other preferred examples of the plasticizer include (di) pentaerythritol esters described in JP-A-11-124445, glycerol esters described in JP-A-11-246704, diglycerol esters described in JP-A-2000-63560, citric acid esters described in JP-A-11-92574, substituted phenylphosphoric acid esters described in JP-A-11-90946, and ester compounds containing an aromatic ring and a cyclohexane ring described in JP-A-2003-165868.

A polymer plasticizer containing a resin component having a molecular weight of 1,000 to 100,000 is also preferably used. Examples thereof include polyesters and polyethers described in JP-A-2002-22956, polyester ethers, polyester urethanes and polyesters described in JP-A-5-197073, copolyester ethers described in JP-A-2-292342, and epoxy resins and novolak resins described in JP-A-2002-146044.

One of these plasticizers may be used alone, or two or more kinds thereof may be mixed and used. The amount of the plasticizer added is preferably from 2 to 30 parts by mass, more preferably from 5 to 20 parts by mass, per 100 parts by mass of the cellulose acylate. Also, in the layer containing the light-transmitting particle, the plasticizer content is preferably increased so as to enhance the affinity of the cellulose acylate for the light-transmitting particle or improve the brittleness.

[Ultraviolet Absorber]

In the light diffusing film, an ultraviolet absorber (ultraviolet inhibitor) is preferably further added for enhancing the light fastness of the film itself or preventing deterioration of a polarizing plate or an image display member such as liquid crystal compound of a liquid crystal display device.

The ultraviolet absorber used preferably has excellent ability of absorbing an ultraviolet ray at a wavelength of 370 nm or less from the standpoint of preventing deterioration of the liquid crystal and preferably exhibits as little absorption as possible for visible light at a wavelength of 400 nm or more in view of good image display property. In particular, the transmittance at a wavelength of 370 nm is preferably 20% or less, more preferably 10% or less, still more preferably 5% or less. Examples of such an ultraviolet absorber include, but are not limited to, an oxybenzophenone-based compound, a benzotriazole-based compound, a salicylic acid ester-based compound, a benzophenone-based compound, a cyanoacrylate-based compound, a nickel complex salt-based compound, and a polymer ultraviolet absorbing compound containing the above-described ultraviolet absorbing group. Two or more kinds of ultraviolet absorbers may be used.

In the present invention, the amount of the ultraviolet absorber used is from 0.1 to 5.0 parts by mass, preferably from 0.5 to 4.0 parts by mass, more preferably from 0.8 to 2.5 parts by mass, per 100 parts by mass of the thermoplastic resin used for the light diffusing film.

The light diffusing film of the present invention is preferably formed using a composition (dope) containing the thermoplastic resin, the light-transmitting particle and other components. In the composition (dope) for forming the light diffusing film, other various additives (for example, a deterioration inhibitor (e.g., antioxidant, peroxide decomposing agent, radical inhibitor, metal inactivating agent, acid scavenger, amine), an optical anisotropy controlling agent, a release agent, an antistatic agent and an infrared absorber) according to use may be added in each preparation step. Such an additive may be either a solid or an oily matter. That is, the melting point or boiling point thereof is not particularly limited. Furthermore, as the infrared absorber, those described, for example, in JP-A-2001-194522 may be used.

These additives may be added at any timing in the dope preparation step, or a step of adding the additives and preparing the composition may be provided as a final preparation step in the dope preparation process. The amount of each material added is not particularly limited as long as its function can be exerted. In the case where the light diffusing film is formed of multiple layers, the kind or amount added of the thermoplastic resin/additive may differ among respective layers. This is a conventionally known technique and described, for example, in JP-A-2001-151902. Regarding details thereof including the ultraviolet absorber above, the materials described in detail in *JIII Journal of Technical Disclosure*, No. 2001-1745, pp. 16-22 (issued on Mar. 15, 2001 by Japan Institute of Invention and Innovation) are preferably used.

Such an additive is preferably used in an appropriate amount within the range of from 0.001 to 20 mass % based on the entire composition constituting the light diffusing film.

[Solvent]

The composition (dope) for forming the light diffusing film may contain a solvent. The solvent used is preferably an organic solvent. The organic solvent includes conventionally known organic solvents and, for example, a solvent having a solubility parameter of 17 to 22 is preferred. The solubility parameter indicates the parameter described, for example, in J. Brandrup, E. H., et al., *Polymer Handbook*, 4th edition, VII/671 to VII/714. Examples of the solvent include a chloride of lower aliphatic hydrocarbon, a lower aliphatic alcohol, a ketone having a carbon number of 3 to 12, an ester having a carbon number of 3 to 12, an ether having a carbon number of 3 to 12, aliphatic hydrocarbons having a carbon number of 5 to 8, aromatic hydrocarbons having a carbon number of 6 to 12, and fluoroalcohols (for example, compounds described in JP-A-8-143709, paragraph [0020], and JP-A-11-60807, paragraph [0037]).

The material forming the light diffusing film is preferably dissolved in an organic solvent in a concentration of 10 to 30 mass % (that is, the solid content concentration of the composition for forming the light diffusing film is preferably from 10 to 30 mass %), more preferably from 13 to 27 mass %, still more preferably from 15 to 25 mass %. As for the method of preparing the composition in such a concentration, the composition may be prepared in a predetermined concentration in the dissolving step, or the composition may be previously prepared as a low-concentration solution (for example, from 9 to 14 mass %) and then formed into a predetermined high-concentration solution in the later-described concentration step. Furthermore, a high-concentration solution of the material for forming the light diffusing film may be previously prepared and thereafter, various additives may be added thereto to obtain a solution having a predetermined low concentration.

As for the solvent used, one kind of a solvent or two or more kinds of solvents may be used.

<Optical Characteristics of Light Diffusing Film>

In the light diffusing film of the present invention, the haze value attributed to the inside (internal haze value) is from 5 to 25%, preferably from 10 to 25%, more preferably from 10 to 20%, still more preferably from 10 to 15%. Within this range, both aspects of front luminance and oblique luminance unevenness can be satisfied.

Figure 2:
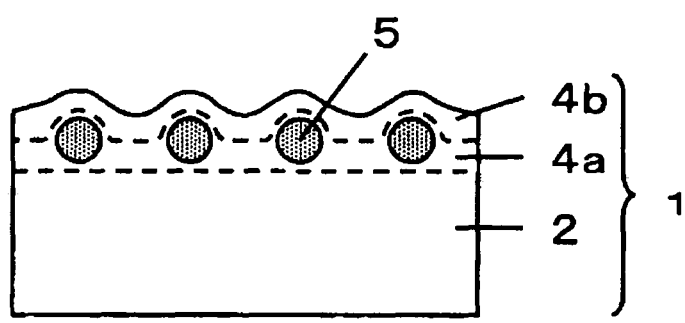
FIG. 2 is a cross-sectional view showing one example of the light diffusing film of the present invention.
Figure 3:
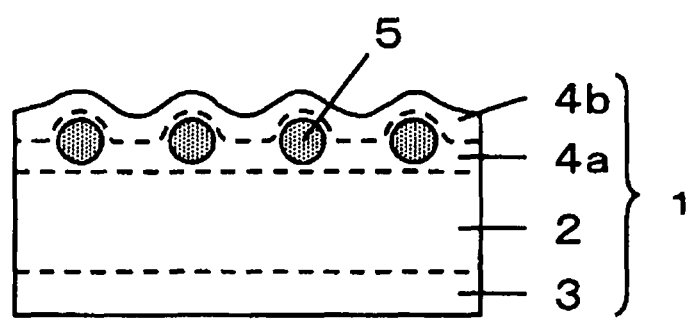
FIG. 3 is a cross-sectional view showing one example of the light diffusing film of the present invention.

In the present invention, the later-described configurations of FIGS. 1 to 3 are preferred, and in such a configuration, the internal haze can be adjusted by the following methods.

1. Adjustment of the amount added of the light-transmitting particle contained in the light-transmitting particle-containing dope (when the amount added is increased, the internal haze rises).

2. Adjustment of the refractive index of the light-transmitting particle contained in the light-transmitting particle-containing dope (when the refractive index difference from the thermoplastic resin binder is increased, the internal haze rises).

3. Adjustment of the thickness of the film portion formed by the light-transmitting particle-containing dope (when the film thickness is increased, the internal haze rises).

In the light diffusing film of the present invention, the haze value attributed to the surface (surface haze value) (the value obtained by subtracting the internal haze value from the total haze value) is from 5 to 20%, preferably from 5 to 15%, more preferably from 8 to 15%, still more preferably from 10 to 15%.

In the present invention, the later-described configurations of FIGS. 1 to 3 are preferred, and in such a configuration, the surface haze can be adjusted by the following methods.

1. Adjustment of the thickness of the film portion formed by the surface profile-adjusting dope (when the film thickness is increased, the surface haze decreases).

2. Adjustment of the amount added of the light-transmitting particle contained in the light-transmitting particle-containing dope (when the amount added is increased, the surface haze rises).

3. Adjustment of the particle size of the light-transmitting particle contained in the light-transmitting particle-containing dope (when the average primary particle diameter is increased, the surface haze rises).

In the light diffusing film of the present invention, the total haze value is from 15 to 30%, preferably from 20 to 30%, more preferably from 23 to 30%.

The total haze can be expressed by the sum of internal haze and surface haze and therefore, the total haze can be adjusted by adjusting the internal haze and the surface haze by the above-described methods.

<Surface Profile of Light Diffusing Film>

The surface profile of the light diffusing film of the present invention is described below.

The light diffusing film of the present invention has concavoconvex shape on at least one surface.

Furthermore, in order to satisfy both front luminance and elimination of oblique luminance unevenness, the concavoconvex shape is preferably the following profile.

In view of both front luminance and oblique luminance unevenness, the light diffusing film of the present invention preferably has a surface profile where the roughness parameters (arithmetic average roughness Ra and average spacing between peaks over the evaluation length Sm) according to JIS B0601 satisfy the following (formula 1) and (formula 2):

$0.10\ \mu m \leq Ra \leq 0.30\ \mu m$ (formula 1)

$50\ \mu m \leq Sm \leq 200\ \mu m$ (formula 2)

The ranges are more preferably $0.16\ \mu m \leq Ra \leq 0.24\ \mu m$ (formula 1')

$60\ \mu m \leq Sm \leq 130\ \mu m$ (formula 2')

still more preferably $0.16\ \mu m \leq Ra \leq 0.24\ \mu m$ (formula 1")

$72\ \mu m \leq Sm \leq 100\ \mu m$ (formula 2")

These roughness parameters can be measured using a measuring meter in accordance with JIS-B0601 (1994, 2001), for example, SURFCORDER MODEL SE-3500 manufactured by Kosaka Laboratory Ltd.

<Preferred Embodiment of Light Diffusing Film>

In order to realize the internal scattering of the present invention and the above-described surface profile, from the standpoint of independently controlling the internal scattering and the surface scattering, it is preferred that the light diffusing film has a region substantially absent of the light-transmitting particle having an average primary particle diameter of 3 to 10 μm and the region has a thickness of 5 to 30 μm in the thickness direction from the surface having concavoconvex shape.

Incidentally, the expression "the region has a thickness of 5 to 30 μm in the thickness direction from the surface having concavoconvex shape" means that at least the region of 0 to 5 μm in the thickness direction from the surface having concavoconvex shape is substantially absent of a light-transmitting particle having an average primary particle diameter of 3 to 10 μm and the maximum depth of the region substantially absent of the light-transmitting particle is 30 μm in the thickness direction from the surface having concavoconvex shape.

Also, it is preferred that in the region of 0 to 20 μm in the thickness direction from the surface opposite to the surface having concavoconvex shape, the light-transmitting particle having an average primary particle diameter of 3 to 10 μm is substantially absent. Thanks to this configuration, a flat surface having substantially no concavoconvex shape is formed and an air bubble is hardly entrained at the processing of a polarizing plate.

The expression "the particle of 3 to 10 μm is substantially absent" as used herein means that when a portion corresponding to a width of 1 mm in the cross-section of the film is observed at 10 portions, the number of particles of 3 to 10 μm observed in the specific film thickness region is less than 10.

Furthermore, from the above-described standpoints, the film is preferably formed by stacking a dope containing a scattering particle having an average primary particle diameter of 3 to 10 μm and a dope not containing a scattering particle.

The thickness of the light diffusing film of the present invention is from 20 to 200 μm, preferably from 20 to 150 μm, and most preferably from 25 to 100 μm.

<Production Method of Light Diffusing Film>

Figure 6:
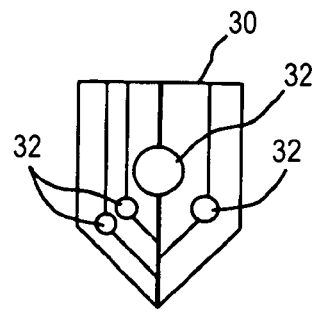
FIG. 6 is a view showing a multi-manifold type co-casting die.
Figure 7:
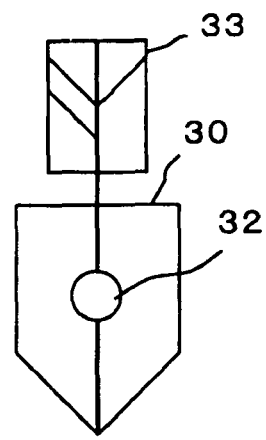
FIG. 7 is a view showing a feed-block type co-casting dye.

In producing the light diffusing film of the present invention, a stack casting method such as co-casting (simultaneous multilayer casting) method and sequential casting method can be used. In the case of producing the film by a co-casting method or a sequential casting method, a plurality of dopes (a dope obtained by dissolving the thermoplastic resin and if desired, the light-transmitting particle and the like in a solvent) are first prepared. The co-casting method is a casting method where the dopes are extruded by a casting geeser (casting die) capable of simultaneously extruding a plurality of dopes (may be three or more layers) from separate slits or the like to simultaneously cast respective layers on a casting support (band or drum) and appropriately dried and thereafter, the stack is separated from the support and dried to form a light diffusing film. As the casting die, either a multi-manifold type shown in FIG. 6 or a feed block type shown in FIG. 7 may be used. An apparatus where a decompression chamber is provided in the dope ejection part is preferred.

Figure 4:
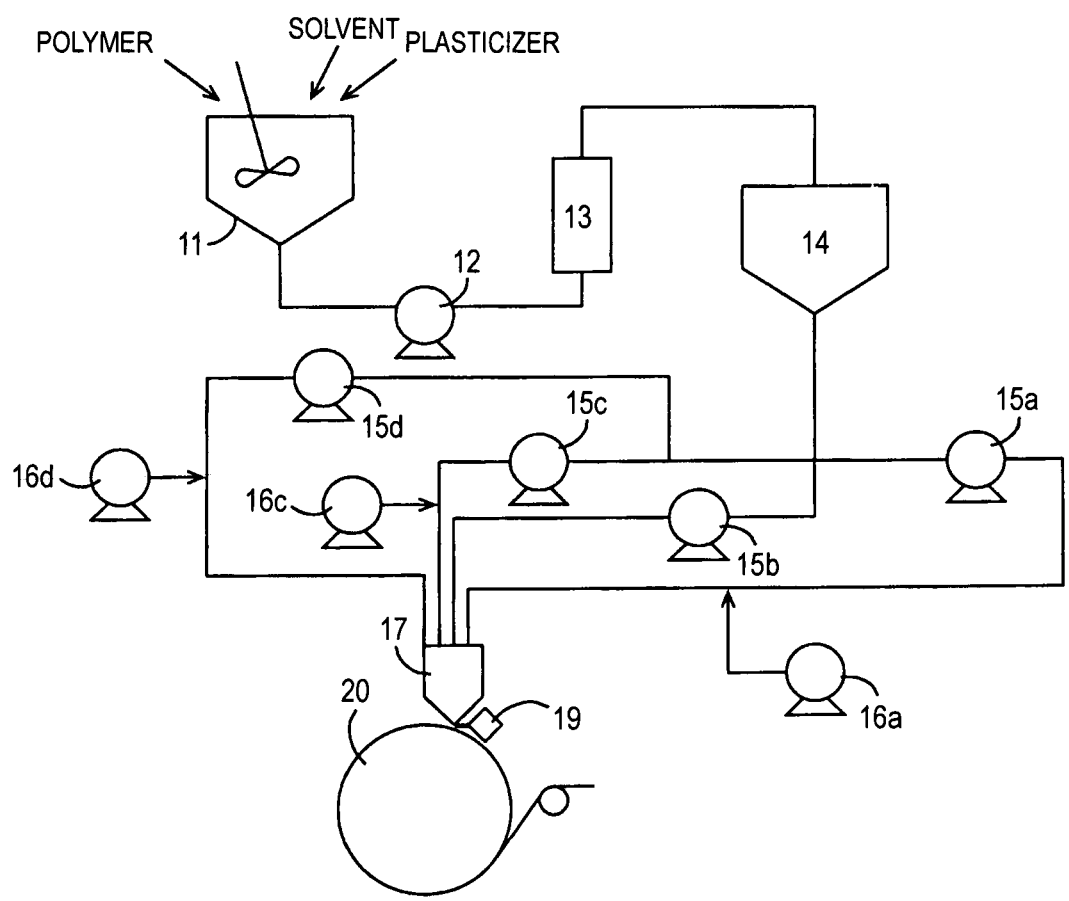
FIG. 4 is a view showing the solution film-forming apparatus using a casting drum.
Figure 5:
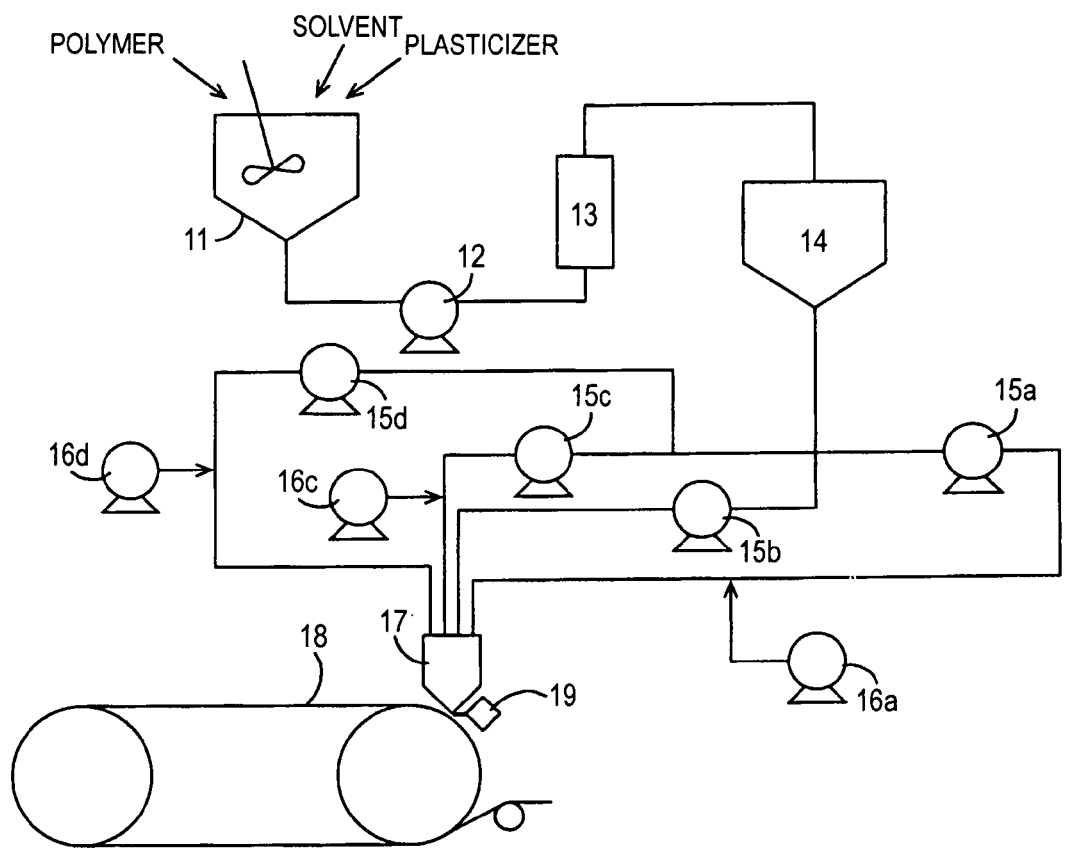
FIG. 5 is a view showing the solution film-forming apparatus using a casting band.

FIGS. 4 and 5 are a view showing an example of the solution film-forming apparatus where casting is performed. FIG. 4 is an example using a casting drum for the support, and particularly when the drum is cooled, the dope can be gelled by cooling during contact with the support or can turn into a gel-like state, allowing for peeling-off at an early timing and yielding high productivity. FIG. 5 is an example using an endless belt for the support and in this method, the solvent is dried to a concentration high enough to provide a self-supporting property while the dopes are in contact with the belt, and thereafter, the stack is peeled off.

The sequential casting method is a casting method where a first casting dope is extruded and cast on a casting support from a casting geeser; after drying or not drying the dope, a second casting dope is extruded and cast thereon from the casting geeser; third and subsequent dopes are sequentially cast and stacked in the same manner; and the stack is peeled off from the support at an appropriate time and dried to form a light diffusing film. Between peeling-off and drying, the base material may be stretched in a fixed direction. Specifically, the base material is preferably stretched, for example, to approximately from 0.9 to 1.5 times in the longitudinal direction and/or the transverse direction.

In this way, for producing the light diffusing film, any method of a co-casting method, a sequential casting method and a melt-extrusion film-forming method may be employed. In general, while the sequential casting method requires a complicated and large-scale process and can hardly maintain the planarity of the film, the co-casting method enjoys a simple process and high productivity. Therefore, the light diffusing film is preferably produced by the co-casting method.

The temperature of the support is preferably set to 20° C. or less so as to prevent leveling at the initial stage of casting, and it is also preferred to, after casting, set the temperature of the support to 0° C. or less to cause gelling by cooling.

Furthermore, in the co-casting method, the dope containing the light-transmitting particle is preferably arranged in the inner layer part of the light diffusing film. In other words, at the casting, not the dope above but a dope substantially free from a particle having an average particle diameter of 1 μm or more, such as light-transmitting particle, is preferably arranged on the support surface or air interface side.

Accordingly, regions differing in the abundance of the light-transmitting particle in the depth direction of the diffusing film are preferably formed, and a region having a large abundance of the light-transmitting particle is preferably present on the air-side outermost surface (surface A) side of the light diffusing film. In terms of the depth in the thickness direction of the light diffusing film from the surface A-side surface, the particle center is preferably present in the region to the depth of 10 to 80% of the total depth from the surface A-side surface, more preferably to the depth of 10 to 75% from the surface A-side surface, and most preferably to the depth of 10 to 50% from the surface A-side surface.

For segregating the light-transmitting particle in a specific depth direction, the light diffusing film may be formed by simultaneously or sequentially casting a plurality of dopes differing in the particle content or by co-extruding a plurality of molten resins differing in the particle content. Furthermore, as long as separation does not occur, the kind of the thermoplastic resin may be different among respective layers. For example, dopes differing in the substituent or substitution amount of the cellulose acylate may be stacked.

In the case of forming the light diffusing film by co-casting using a plurality of dopes, the thickness ratio between the surface layer dope (when having a surface layer on both sides, the total thickness) and the base layer dope {(total thickness of surface layer dope)/(thickness of base layer dope)×100} is preferably from 5 to 120%, more preferably from 10% to 100%. When the thickness ratio is 5% or more, a uniform layer can be easily formed, and when the thickness ratio is 120% or less, the interface of dopes is stabilized and the surface shape is less likely to be impaired. The term "thickness of a dope" as used herein means the thickness of a dope after the solvent is vaporized. Also, the terms "surface layer dope" and "base layer dope" indicate a state where a surface layer and a base layer in a dope state of a thermoplastic resin being dissolved in a solvent are cast from a casting die to lie adjacent to each other, and does not necessarily indicate that an interface is present in the light diffusing film after evaporation of the solvent.

In a preferred production method of the light diffusing film by co-casting or sequential casting of the present invention, a light-transmitting particle-containing dope containing a thermoplastic resin and at least one kind of a light-transmitting particle having an average primary particle diameter of 3 to 10 μm, and a surface profile-adjusting dope being composed of a thermoplastic resin and substantially free from a particle of 1 μm or more and having a lower resin concentration than in the light-transmitting particle-containing dope are cast in this order to form the film.

Here, the light-transmitting particle-containing dope may be a base layer dope (forming the layer 2 in FIG. 1) or a surface layer dope (forming the layer 4a in FIGS. 2 and 3).

The surface profile-adjusting dope corresponds to the surface layer dope (forming the layer 4 in FIG. 1 or the layer 4b in FIGS. 2 and 3).

The thermoplastic resin concentration of the surface profile-adjusting dope is preferably lower by 0.1 to 8.0 mass %, more preferably by 1.0 to 5.0 mass %, than the resin concentration of the base layer dope.

The light-transmitting particle-containing dope may be cast on a dope composed of a thermoplastic resin and substantially free from a particle of 1 μm or more (forming the layer 3 in FIG. 1 or the layer 2 in FIGS. 2 and 3).

Also, between the above-described plurality of dopes and the support, a surface layer dope (layer 3 in FIGS. 1 and 3) substantially free from a particle of 1 μm or more and lower in the thermoplastic resin concentration than the adjacent dope may be cast. The resin concentration of the dope is preferably lower by 0.1 to 8.0 mass %, more preferably by 1.0 to 5.0 mass %, than the resin concentration of the adjacent dope.

By setting the resin concentration of the surface layer dope to a low concentration, "skinning" (that is, a state where drying proceeds only on the dope surface to increase the resin concentration and no drying proceeds in the inside of the dope) does not occur during drying and the productivity can be enhanced. Also, in the embodiment of FIG. 3, by setting the resin concentration of the layer 3 to a low concentration, a smooth back surface (surface B) is obtained.

According to the production method of the light diffusing film of the present invention, a film having optimal scattering property can be consistently produced as a light diffusing film, so that the number of steps can be decreased as compared with the technique of imparting scattering property by coating or the like and the cost can be reduced. At the same time, the obtained light diffusing film is substantially free from an interface and therefore, a problem such as adherence or interference unevenness generated between interfaces does not arise.

Also, within the range where the objective surface profile is maintained, the surface A-side dope may contain a light/heat-curable monomer, an electrically conductive inorganic fine particle, an electrically conductive polymer, a fluorine- or silicone-containing antifouling material, a slipping agent and the like. For preventing blocking, the light diffusing film may contain an inorganic fine particle having a primary particle diameter of less than 1 μm on the surface A and/or surface B sides.

Furthermore, a hardcoat layer, an antiglare layer, an electrically conductive inorganic fine particle-containing layer, an electrically conductive polymer layer, an fluorine- or silicone-containing antifouling layer, a low refractive index layer, an antireflection layer or the like may be stacked on the surface A.

<Preparation of Dope>

In the preparation of the solution (dope) of the material forming the light diffusing film, such as cellulose acylate, the method for dissolving the material is not particularly limited as described above, and the dissolution is performed by a room-temperature dissolution method, a cooling dissolution method, a high-temperature dissolution method, or a combination thereof. In this respect, a preparation method of a cellulose acylate solution is described, for example, in JP-A-5-163301, JP-A-61-106628, JP-A-58-127737, JP-A-9-95544, JP-A-10-95854, JP-A-10-45950, JP-A-2000-53784, JP-A-11-322946, JP-A-11-322947, JP-A-2-276830, JP-A-2000-273239, JP-A-11-71463, JP-A-04-259511, JP-A-2000-273184, JP-A-11-323017 and JP-A-11-302388. The technology in these methods for dissolving a cellulose acylate in an organic solvent can be appropriately applied also to the present invention within the scope thereof. In respect to details thereof, particularly, details of a non-chlorine type solvent system, the method described in detail in *JIII Journal of Technical Disclosure*, No. 2001-1745, pp. 22-25 is performed. Furthermore, the dope solution of a cellulose acylate is usually subjected to solution concentration and filtration, and these are described in detail similarly in *JIII Journal of Technical Disclosure*, No. 2001-1745, page 25. Incidentally, in the case of performing the dissolution at a high temperature, the temperature is in most cases not lower than the boiling point of the organic solvent used and at this time, the system is used in a pressurized state.

In the case where the light diffusing film of the present invention is used as a protective film of a polarizing plate and adhered to a polarizing film, in view of adhesion to the polarizing film, the light diffusing film is preferably subjected to a treatment of making the surface hydrophilic, such as acid treatment, alkali treatment, plasma treatment and corona treatment.

In view of adhesion and the like, the surface energy on the surface B side of the light diffusing film is preferably 55 mN/m or more, more preferably from 60 to 75 mN/m. The surface energy can be adjusted by the above-described surface treatment.

<Polarizing Plate>
[Configuration of Polarizing Plate]

The light diffusing film of the present invention can be used as a protective film in a polarizing plate comprising a polarizing film and a protective film disposed at least on one side thereof. In producing a polarizing plate by using the light diffusing film of the present invention, surface A is used on the surface side of the polarizing plate and surface B is used on the polarizing film side, whereby objective optical properties of the present invention can be obtained. The light diffusing film of the present invention serves also as a protective film, so that the production cost of the polarizing plate can be reduced.

Also, by using the light diffusing film of the present invention on the backlight-side surface, both the front contrast and the reduction of moire or luminance unevenness can be satisfied. That is, the light diffusing film of the present invention is preferably used for a protective film of the backlight-side polarizing plate in a liquid crystal display device.

As for the configuration of the polarizing plate, in the embodiment of disposing a protective film on both surfaces of the polarizing film, the light diffusing film of the present invention may be used as one protective film, and a normal cellulose acetate film may be used as the other protective film. A retardation film may be also used for the other protective film.

Furthermore, in the polarizing plate of the present invention, it is also a preferred embodiment that one surface is the light diffusing film of the present invention and the other protective film is an optically compensatory film having an optically anisotropic layer composed of a liquid crystalline compound.

[Polarizing Film]

The polarizing film includes an iodine-based polarizing film, a dye-based polarizing film using a dichroic dye, and a polyene-based polarizing film. The iodine-based polarizing film and the dye-based polarizing film can be generally produced using a polyvinyl alcohol-based film.

The polarizing film used may be a known polarizing film or a polarizing film cut out from a lengthy polarizing film with the absorption axis of the polarizing film being neither parallel nor perpendicular to the longitudinal direction. The lengthy polarizing film with the absorption axis of the polarizing film being neither parallel nor perpendicular to the longitudinal direction is produced by the following method.

That is, the lengthy polarizing film can be produced by a stretching method where a continuously fed polymer film such as polyvinyl alcohol-based film is stretched at a stretch ratio of 1.1 to 20.0 times at least in the film width direction by applying a tension while holding both ends of the film with holding means and under the condition that the difference in the longitudinal travelling speed between the holding devices at both ends of the film is within 3%, the film travelling direction is bent in a state of the film being held at both ends to create a tilt angle of 20 to 70° between the film travelling direction at the outlet in the step of holding both ends of the film and the real stretching direction of the film. Particularly, a lengthy polarizing film produced with a tilt angle of 45° is preferred in view of productivity.

[Optically Compensatory Film]

It is also a preferred embodiment that out of two protective films of the polarizing film, the film other than the light diffusing film of the present invention is an optically compensatory film having an optically compensatory layer containing an optically anisotropic layer. The optically compensatory film (retardation film) can improve the viewing angle properties on a liquid crystal display screen.

The optically compensatory film used may be a known optically compensatory film, but from the standpoint of widening the viewing angle, the optically compensatory film described in JP-A-2001-100042 is preferred.

<Use Mode of the Present Invention>
[Image Display Device]

The light diffusing film of the present invention is suitably used for an image display device such as liquid crystal display device (LCD), plasma display panel (PDP), electroluminescent display (ELD) and cathode ray tube display (CRT). In particular, the light diffusing film is preferably used for a liquid crystal display device.

[Liquid Crystal Display Device]

The light diffusing film and the polarizing plate of the present invention can be advantageously used for an image display device such as liquid crystal display device and, in particular, is preferably used as the outermost surface layer on the backlight side of a liquid crystal cell.

In general, the liquid crystal display device has a liquid crystal cell and two polarizing plates disposed on both sides thereof, and the liquid crystal cell carries a liquid crystal between two electrode substrates. In some cases, one optically anisotropic layer is disposed between the liquid crystal cell and one polarizing plate, or two optically anisotropic layers are disposed, that is, one between the liquid crystal cell and one polarizing plate, and another between the liquid crystal cell and another polarizing plate.

The liquid crystal display device of the present invention in a preferred embodiment comprises a liquid crystal display element and a backlight structure for irradiating the liquid crystal display element, the backlight structure including at least a diffuser plate and two prism sheets being disposed between the diffuser plate and the liquid crystal element and having a large number of fine prism grooves on the liquid crystal display element-side surface, wherein the angle between the groove direction of the prism groove of the two prism sheets and the repeating direction of pixels in the liquid crystal element is 4 to 86°, the two prism sheets are disposed by arranging the groove directions of prism grooves to run at right angles to one another, and the light diffusing sheet of the present invention or a polarizing plate having the light diffusing sheet of the present invention is provided between the two prism sheets and the liquid crystal element.

The liquid crystal cell is preferably of a TN mode, a VA mode, an OCB mode, an IPS mode or an ECB mode.

EXAMPLES

Example 1

Production of Light Diffusing Film 101

Respective dopes were produced by adding the light-transmitting particle shown in Table 1 to each of the following solid content formulations for dope and simultaneously cast to provide a configuration where the base layer dope and the surface layer dope have a thickness shown in Table 2 after drying, whereby Light Diffusing Film 101 was produced.

In the production of Light Diffusing Film 101, using the casting apparatus shown in FIG. 4, dopes were cast such that the dope for surface layer 1 came to the mirror-finished drum side cooled to −10° C., and gelled by cooling while volatilizing the solvent, and the web was peeled off. The web was then dried with hot air at 100° C. until the residual solvent amount became 10 mass %, and further dried with hot air at 140° C. for 10 minutes.

Incidentally, the dopes were prepared with a mixed solvent of methylene chloride:methanol in a weight ratio of 90:10 such that the solid content concentration of the base layer dope became 23 mass % and the solid content concentration of each of the surface layer dope containing no light-transmitting particle and the surface layer dope containing a light-transmitting particle became 18 mass %.

The viscosity at room temperature of the surface layer dope disposed on the air-side outermost surface (surface A) side of the light diffusing film was from 20 to 50 Pa·s in all samples. Here, in the formulation of Table 1, the concentration of the thermoplastic resin is also proportional to the above-described solid content concentration. That is, as the dope has a higher solid content concentration, the concentration of the thermoplastic resin is higher.

[Production of Light Diffusing Films 102 to 125]

Light Diffusing Films 102 to 125 were produced by changing the light diffusing particle in Solid Content Formulation C for Dope of Light Diffusing Film 101 to those shown in Table 3, changing the thickness of the surface layer 3 as shown in Table 3 to give the values of haze, Ra and Sm shown in Table 3, and adjusting the amount added of the light-transmitting particle according to the method described above. Incidentally, the values of Ra and Sm are a value for the concavoconvex shape of the surface on the surface layer 3 side.

In all of the light diffusing films, the refractive index was 1.48. The film thickness of Table 2 indicates the design thickness after drying.

TABLE 1

| Formulation (solid content ratio, parts by mass) | | | Solid Content Formulation for Dope | | |
|---|---|---|---|---|---|
| | | | A | B | C |
| Cellulose triacetate | | | 100 | 100 | 100 |
| Triphenyl phosphate | | | 8 | 8 | 8 |
| Biphenyldiphenyl phosphate | | | 4 | 4 | 4 |
| Ultraviolet absorber | | | 2 | 2 | 2 |
| Fine particle | R972 | Reactive index 1.47 | 0.1 | — | — |
| Light-transmitting particle | SSX-106 | 1.50 | — | — | 15 |

TABLE 2

| Light-Transmitting Particle | Solid Content Formulation for Dope | | | | Film Thickness (μm) | | | |
|---|---|---|---|---|---|---|---|---|
| | Surface Layer 1 | Base Layer | Surface Layer 2 | Surface Layer 3 | Surface Layer 1 | Base Layer | Surface Layer 2 | Surface Layer 3 |
| Light Diffusing Film 101 | A | B | C | B | 3 | 35 | 10 | 8 |

TABLE 3

| Remarks | Light Diffusing Film | Light-Transmitting Particle | Average Particle Diameter (μm) | Refractive Index | Difference of Refractive Index Δ | Thickness (μm) Surface Layer 2 | Thickness (μm) Surface Layer 3 | Total Film Thickness μm |
|---|---|---|---|---|---|---|---|---|
| Example | 101 | SSX-106 | 6.0 | 1.500 | 0.020 | 10 | 8 | 56 |
| Example | 102 | SSX-106 | 6.0 | 1.500 | 0.020 | 10 | 12 | 60 |
| Example | 103 | SSX-106 | 6.0 | 1.500 | 0.020 | 10 | 10 | 58 |
| Example | 104 | SSX-106 | 6.0 | 1.500 | 0.020 | 10 | 9 | 57 |
| Example | 105 | SSX-106 | 6.0 | 1.500 | 0.020 | 10 | 7 | 55 |
| Example | 106 | SSX-106 | 6.0 | 1.500 | 0.020 | 10 | 7 | 55 |
| Example | 107 | SSX-106 | 6.0 | 1.500 | 0.020 | 10 | 8 | 56 |
| Example | 108 | SSX-106 | 6.0 | 1.500 | 0.020 | 10 | 8 | 56 |
| Example | 109 | SSX-106 | 6.0 | 1.500 | 0.020 | 10 | 8 | 56 |
| Example | 110 | SSX-103 | 3.0 | 1.500 | 0.020 | 10 | 5 | 53 |
| Example | 111 | SSX-105 | 5.0 | 1.500 | 0.020 | 10 | 5 | 53 |
| Example | 112 | SSX-108 | 8.0 | 1.500 | 0.020 | 10 | 15 | 63 |
| Example | 113 | XX-151S | 10.0 | 1.530 | 0.050 | 10 | 20 | 68 |
| Example | 114 | XX-146S | 8.0 | 1.510 | 0.030 | 10 | 15 | 63 |
| Example | 115 | XX-147S | 8.0 | 1.520 | 0.040 | 10 | 15 | 63 |
| Example | 116 | XX-118S | 8.0 | 1.540 | 0.060 | 10 | 15 | 63 |
| Example | 117 | SSX-106 | 8.0 | 1.500 | 0.020 | 10 | 12 | 60 |
| Example | 118 | SSX-106 | 8.0 | 1.500 | 0.020 | 10 | 8 | 56 |
| Example | 119 | SSX-106 | 8.0 | 1.500 | 0.020 | 10 | 8 | 56 |
| Example | 120 | SSX-106 | 8.0 | 1.500 | 0.020 | 10 | 8 | 56 |
| Comparative Example | 121 | SSX-103 | 3.0 | 1.500 | 0.020 | 10 | 3 | 51 |
| Comparative Example | 122 | XX-173S | 6.0 | 1.530 | 0.050 | 10 | 15 | 63 |
| Comparative Example | 123 | XX-173S | 6.0 | 1.530 | 0.050 | 10 | 10 | 58 |
| Comparative Example | 124 | XX-107S | 8.0 | 1.555 | 0.075 | 10 | 15 | 63 |
| Comparative Example | 125 | XX-118S | 8.0 | 1.540 | 0.060 | 10 | 15 | 63 |

TABLE 3-continued

| Remarks | Total Hz % | Surface Hz % | Internal Hz % | Ra (μm) | Sm (μm) | Front Luminance | Moire | Oblique Luminance Unevenness |
|---|---|---|---|---|---|---|---|---|
| Example | 25 | 12 | 13 | 0.18 | 80 | A | A | AA |
| Example | 25 | 5 | 20 | 0.18 | 120 | A | A | AB |
| Example | 25 | 8 | 17 | 0.18 | 100 | A | A | A |
| Example | 25 | 10 | 15 | 0.18 | 92 | A | A | AA |
| Example | 25 | 15 | 10 | 0.18 | 72 | A | A | AA |
| Example | 25 | 20 | 5 | 0.18 | 60 | A | A | A |
| Example | 30 | 15 | 15 | 0.18 | 72 | A | A | AA |
| Example | 20 | 12 | 8 | 0.18 | 72 | A | A | AA |
| Example | 15 | 10 | 5 | 0.18 | 72 | A | A | B |
| Example | 25 | 12 | 13 | 0.18 | 60 | A | A | A |
| Example | 25 | 12 | 13 | 0.18 | 80 | A | A | AA |
| Example | 25 | 12 | 13 | 0.20 | 80 | A | A | AA |
| Example | 25 | 12 | 13 | 0.20 | 100 | A | A | B |
| Example | 25 | 12 | 13 | 0.18 | 90 | A | A | AA |
| Example | 25 | 12 | 13 | 0.18 | 100 | A | A | A |
| Example | 25 | 12 | 13 | 0.18 | 100 | A | A | B |
| Example | 25 | 12 | 13 | 0.16 | 76 | A | A | A |
| Example | 25 | 12 | 13 | 0.20 | 86 | A | A | AA |
| Example | 25 | 12 | 13 | 0.22 | 93 | A | A | AA |
| Example | 25 | 12 | 13 | 0.24 | 107 | A | A | A |
| Comparative Example | 25 | 22 | 3 | 0.18 | 50 | A | A | C |
| Comparative Example | 25 | 3 | 22 | 0.16 | 150 | A | A | C |
| Comparative Example | 34 | 12 | 22 | 0.18 | 100 | B | A | AB |
| Comparative Example | 25 | 12 | 13 | 0.18 | 110 | A | A | C |
| Comparative Example | 60 | 25 | 35 | 0.22 | 72 | C | A | B |

These results reveal the followings.

1. An optical film comprising a thermoplastic resin as the main component and containing, in the thermoplastic resin, at least one kind of a light-transmitting particle having an average primary particle diameter of 3 to 10 μm, wherein the absolute value of the refractive index difference between the thermoplastic resin and the light-transmitting particle is from 0.01 to 0.06, wherein one surface has an unevenness, the total haze value is from 15 to 30%, the internal haze value is from 5 to 25%, the surface haze value is from 5 to 20%, and the average film thickness is from 20 to 200 μm, ensures high front luminance and excellent effect of eliminating luminance unevenness when used as a polarizing plate protective film on the backlight side of a liquid crystal display device.

2. The front luminance decreases when the total haze value is high, but by controlling the total haze value to 30% or less, reduction in the front luminance can be suppressed.

3. In the present invention, the total haze value is from 15 to 30% and an effect of improving luminance unevenness can be obtained while suppressing reduction in the front luminance (Light Diffusing Films 101 to 109).

4. When the surface haze and internal haze are adjusted by fixing the total haze value to 25%, an effect of preventing oblique luminance unevenness cannot be sufficiently obtained by designing the surface haze or internal haze alone (Light Diffusing Films 121 and 122), but the luminance unevenness is improved when the surface haze value is from 5 to 20% and the internal haze value is from 20 to 5%, and an extremely high effect of preventing luminance unevenness is obtained when the surface haze value is from 10 to 15% and the internal haze value is from 10 to 15% (Light Diffusing Films 101 to 106).

5. The light-transmitting particle can exert its performance when the average primary particle diameter thereof is from 3 to 10 μm, and the average primary particle diameter is preferably from 5 to 8 μm (Light Diffusing Films 101 and 110 to 113).

6. The refractive index difference between the thermoplastic resin and the particle needs to be from 0.01 to 0.06 and is preferably from 0.01 to 0.03 (Light Diffusing Films 101, 114 to 116 and 124).

In all of the light diffusing films above, a particle having a particle diameter of 3 to 10 μm was substantially absent in the region of 0 to 5 μm in the thickness direction from the surface on the surface layer 3 side, and the depth of the region substantially absent of the particle was 30 μM at a maximum. Also, a particle having a particle diameter of 3 to 10 μm was absent in the region of 0 to 20 μm in the thickness direction from the surface on the surface layer 1 side.

The materials used are shown below.

Cellulose Triacetate:

Acetyl substitution degree: 2.86, viscosity average polymerization degree: 310.

Ultraviolet Absorber:

A benzotriazole-based ultraviolet absorber (a 20/80 mass % mixture of TINUVIN 326/TINUVIN 328, each produced by Ciba Japan).

R972:

AEROSIL R972, produced by Nippon Aerosil K.K., primary particle size: about 16 nm.

SSX-103:

Crosslinked polymethyl methacrylate truly spherical particle, average particle diameter (means an average primary particle diameter; in the following, the same applies): 3.0 μm, produced by Sekisui Plastics Co., Ltd.

SSX-105:

Crosslinked polymethyl methacrylate truly spherical particle, average particle diameter: 5.0 μm, produced by Sekisui Plastics Co., Ltd.

SSX-106:
Crosslinked polymethyl methacrylate truly spherical particle, average particle diameter: 6.0 μm, produced by Sekisui Plastics Co., Ltd.
SSX-108:
Crosslinked polymethyl methacrylate truly spherical particle, average particle diameter: 8.0 μm, produced by Sekisui Plastics Co., Ltd.
XX-173S:
Crosslinked polymethyl methacrylate-styrene copolymer truly spherical particle, average particle diameter: 6 μm, produced by Sekisui Plastics Co., Ltd.)
XX-118S:
Crosslinked polymethyl methacrylate-styrene copolymer truly spherical particle, average particle diameter: 8 μm, produced by Sekisui Plastics Co., Ltd.
XX-107S:
Crosslinked polymethyl methacrylate-styrene copolymer truly spherical particle, average particle diameter: 8 μm, produced by Sekisui Plastics Co., Ltd.
XX-151S:
Crosslinked polymethyl methacrylate-styrene copolymer truly spherical particle, average particle diameter: 10 μm, produced by Sekisui Plastics Co., Ltd.
XX-146S:
Crosslinked polymethyl methacrylate-styrene copolymer truly spherical particle, average particle diameter: 8 μm, produced by Sekisui Plastics Co., Ltd.
XX-147S:
Crosslinked polymethyl methacrylate-styrene copolymer truly spherical particle, average particle diameter: 8 μm, produced by Sekisui Plastics Co., Ltd.

In determining the refractive index of the particle, the particles were dispersed in equal amounts in solvents prepared by changing the mixing ratio of two kinds of solvents differing in the refractive index and thereby varying the refractive index, and after measuring the turbidity, the refractive index of the solvent at the minimum turbidity was measured by an Abbe refractometer.

[Evaluation of Light Diffusing Film]

(1-1) Haze

[1] The total haze (H) of the obtained light diffusing film was measured in accordance with JIS K7136, where a haze meter, NDH2000, manufactured by Nippon Denshoku Industries Co., Ltd. was used.

[2] Several drops of a microscope immersion oil (Immersion Oil Type A, produced by Nikon Corp., refractive index n=1.515) were added to the front and back surfaces of the light diffusing film, the film was sandwiched from front and back sides between two glass plates having a thickness of 1 mm (Micro Slide Glass Product No. S9111, produced by MATSUNAMI), making these two glass plates and the obtained optical film stick together completely, the haze was measured in a state of the surface haze being removed, a haze separately measured by inserting only a silicon oil between two glass plates was subtracted from the haze measured, and the obtained value was calculated as the internal haze (Hin).

[3] The value obtained by subtracting the internal haze (Hin) calculated in [2] from the total haze (H) measured in [1] was calculated as the surface haze (Hout) of the film.

(1-2) Moire

A notebook PC(R700-XP50K) manufactured by LG Display was disassembled, the upper diffuser sheet disposed between the backlight and the panel was removed, and the light diffusing film produced above was adhered, with a pressure-sensitive adhesive, on the backlight-side polarizing plate laminated to the liquid crystal cell (the pressure-sensitive adhesive was attached to the surface layer 1 side).

Signals were input into the produced liquid crystal display device from a video signal generator (VG-848, manufactured by ASTRODESIGN, Inc.) and by displaying a gray color with 128/256 gradation levels in an entirely solid display mode, the moire was observed with an eye 50 cm away from the display screen in the normal direction (polar angle: 0°) of the display device and evaluated on a 6-grade scale according to the following criteria.

Incidentally, in the notebook PC above, two prism sheets having a large number of prism grooves were mounted between the upper diffuser sheet and the lower diffuser sheet, where the angle between the groove direction of the prism groove of two prism sheets and the repeating direction of pixels in the liquid crystal display element was 45° and the two prism sheets were disposed by arranging the groove directions of prism grooves of respective prism sheets to run at right angles to each other.

A: Moire is not observed.
B: Moire is slightly observed.
C: Moire is clearly observed.

(1-3) Oblique Luminance Unevenness

On the liquid crystal display device fabricated in the moire evaluation, a gray color with 128/256 gradation levels was displayed in an entirely solid display mode by the same method as in moire evaluation, and a stripe-like luminance unevenness was observed with an eye from an oblique 45° direction (azimuth angle: 45°) at a position 50 cm apart in the direction 60° tilted from the normal line (polar angle: 60°) and furthermore, observed while varying the observation angle by ±5° around the oblique 45° direction. The presence or absence of a stripe-like luminance unevenness was evaluated on a 6-grade scale according to the following criteria.

Incidentally, in the notebook PC above, two prism sheets having a large number of prism grooves were mounted between the upper diffuser sheet and the lower diffuser sheet, where the angle between the groove direction of the prism groove of two prism sheets and the repeating direction of pixels in the liquid crystal display element was 45° and the two prism sheets were disposed by arranging the groove directions of prism grooves to run at right angles to each other.

AA: A stripe-like luminance unevenness is not observed when viewed either from the oblique 45° direction or from the oblique 45±5° directions.
A: A stripe-like luminance unevenness is not observed when viewed from the oblique 45° direction but a stripe-like luminance unevenness is slightly observed when viewed from the oblique 45±5° directions.
AB: A stripe-like luminance unevenness is slightly observed when viewed from the oblique 45° direction, but the improvement effect by the light diffusing sheet can be distinctly recognized.
B: A stripe-like luminance unevenness is observed when viewed from the oblique 45° direction, but the improvement effect by the light diffusing sheet can be recognized.
C: A stripe-like luminance unevenness is distinctly observed when viewed from the oblique 45° direction, but the improvement effect by the light diffusing sheet can be slightly recognized.
CC: On viewing from the oblique 45° direction, a stripe-like luminance unevenness is observed in the same level as when a light diffusing sheet is not provided.

(1-3) Front White Luminance

On the liquid crystal display device fabricated in the moire evaluation, a white color with 256/256 gradation levels was displayed in an entirely solid display mode by the same method as in moire evaluation, and luminance was measured by a luminance meter (BM5-A, manufactured by TOPCON Corp.) from the normal (front) direction of the liquid crystal display device plane in dark room. The center point of the screen, 1 point in each of up and down directions, and 1 point in each of left and right directions, at intervals of 3 cm from the center point, that is, 5 points in total, were measured, and the average value was calculated. Based on the luminance when using no light diffusing film on the surface of the backlight-side polarizing plate, the luminance was evaluated on the following 3-grade scale.
A: Scarcely decreased (99% or more of the reference value).
B: Slightly decreased (from 97% to less than 99% of the reference value).
C: Decreased (less than 97% of the reference value); a problematic level.
(2) Observation of Cross-Sectional Shape of Light Diffusing Film: Observation of Particle Position in Thickness Direction The cross-section passing the center of a particle was cut in the light diffusing film by a microtome, and by observing the cross-section of the base material with a scanning electron microscope, the distance (thickness) between the grain interface and the surface A-side surface or the surface B-side surface was measured.
[Production of Polarizing Plate]

Each of Light Diffusing Films 101 to 125 produced was dipped in an aqueous 1.5 N NaOH solution at 55° C. for 2 minutes, thereby performing saponification treatment, and then dried at 100° C. for 3 minutes. The surface B of the light diffusing film after saponification, a stretched iodine-based PVA polarizer, and a triacetyl cellulose film (TD80UL, produced by Fujifilm Corp.) were laminated in this order by using a PVA-based adhesive and thermally dried to obtain Polarizing Plates 201 to 225.

As a control for comparison, Polarizing Plate 226 was obtained by laminating triacetyl cellulose film (TD80UL, produced by Fujifilm Corp.) to both surfaces.
[Production of Image Display Device]

A notebook PC(R700-XP50K) manufactured by LG Display was disassembled, the upper diffuser sheet disposed between the backlight and the liquid crystal panel was removed, the backlight-side polarizing plate laminated to the liquid crystal cell was separated, and instead, each of Polarizing Plates 201 to 226 was laminated through a pressure-sensitive adhesive (the pressure-sensitive adhesive was attached to the TD80UL side) to produce Liquid Crystal Display Devices 301 to 326.

Incidentally, in the notebook PC above, two prism sheets having a large number of prism grooves were mounted between the upper diffuser sheet and the lower diffuser sheet, where the angle between the groove direction of the prism groove of two prism sheets and the repeating direction of pixels in the liquid crystal display element was 45° and the two prism sheets were disposed by arranging the groove directions of prism grooves of respective prism sheets to run at right angles to each other.

A notebook PC(R700-XP50K) manufactured by LG Display was disassembled, and the upper diffuser sheet disposed between the backlight and the liquid crystal panel was removed. Also, two prism sheets disposed between the backlight and the upper diffuser sheet were removed, and the same prism sheets were cut out and disposed by arranging their installation directions to make angles of 0° and 90°, respectively, with respect to the repeating direction of pixels. Furthermore, according to the configurations of Liquid Crystal Display Devices 327 to 329 of Table 4, the polarizing plate was selected and laminated through a pressure-sensitive adhesive (the pressure-sensitive adhesive was attached to the TD80UL side) to produce Liquid Crystal Display Devices 327 to 329.

[Evaluation of Light Diffusing Film and Image Display Device Using the Same]

The produced Liquid Crystal Display Devices 301 to 329 were evaluated for the front white luminance and the following matters according to the same criteria as in the evaluation of the light diffusing film above. The results are shown in Table 4.

TABLE 4

| Image Display Device | Polarizing Plate | Angle Between Prism Sheet Groove and Pixel | Angle Between Prism Sheet Grooves | Front Luminance | Moire | Oblique Luminance Unevenness | Remarks |
|---|---|---|---|---|---|---|---|
| 301 | 201 | 45° | 90° | A | A | AA | Example |
| 302 | 202 | 45° | 90° | A | A | AB | Example |
| 303 | 203 | 45° | 90° | A | A | A | Example |
| 304 | 204 | 45° | 90° | A | A | AA | Example |
| 305 | 205 | 45° | 90° | A | A | AA | Example |
| 306 | 206 | 45° | 90° | A | A | A | Example |
| 307 | 207 | 45° | 90° | A | A | AA | Example |
| 308 | 208 | 45° | 90° | A | A | AA | Example |
| 309 | 209 | 45° | 90° | A | A | B | Example |
| 310 | 210 | 45° | 90° | A | A | A | Example |
| 311 | 211 | 45° | 90° | A | A | AA | Example |
| 312 | 212 | 45° | 90° | A | A | AA | Example |
| 313 | 213 | 45° | 90° | A | A | B | Example |
| 314 | 214 | 45° | 90° | A | A | AA | Example |
| 315 | 215 | 45° | 90° | A | A | A | Example |
| 316 | 216 | 45° | 90° | A | A | B | Example |
| 317 | 217 | 45° | 90° | A | A | A | Example |
| 318 | 218 | 45° | 90° | A | A | AA | Example |
| 319 | 219 | 45° | 90° | A | A | AA | Example |
| 320 | 220 | 45° | 90° | A | A | A | Example |
| 321 | 221 | 45° | 90° | A | A | C | Comparative Example |

TABLE 4-continued

| Image Display Device | Polarizing Plate | Angle Between Prism Sheet Groove and Pixel | Angle Between Prism Sheet Grooves | Front Luminance | Moire | Oblique Luminance Unevenness | Remarks |
|---|---|---|---|---|---|---|---|
| 322 | 222 | 45° | 90° | A | A | C | Comparative Example |
| 323 | 223 | 45° | 90° | B | A | AB | Comparative Example |
| 324 | 224 | 45° | 90° | A | A | C | Comparative Example |
| 325 | 225 | 45° | 90° | C | A | B | Comparative Example |
| 326 | 226 | 45° | 90° | A | A | CC | Comparative Example |
| 327 | 201 | 0° | 90° | A | B | AA | Example |
| 328 | 225 | 0° | 90° | C | A | B | Comparative Example |
| 329 | 226 | 0° | 90° | A | C | CC | Comparative Example |

These results reveal the followings.

In the conventional configuration where the angle between the groove direction of the prism sheet and the repeating direction of pixels was nearly 0° and a light diffusing film having a haze value of 60% was used as the backlight-side protective film of the lower polarizing plate, the moire at the front was eliminated, but the front luminance was decreased and the effect of eliminating the oblique luminance unevenness was not excellent.

When the light diffusing film of the present invention was used as a protective film of the back surface-side polarizing plate of a liquid crystal display device using a prism sheet, reduction in the surface luminance did not occur, moire produced due to interference of the prism sheet and the pixel was reduced, and the luminance unevenness in the oblique direction was eliminated.

In particular, when the light diffusing film is mounted in a liquid crystal display device where the angle between the groove direction of the prism groove of the prism sheet and the repeating direction of pixels in the liquid crystal element is from 4 to 86° and those two prism sheets are disposed by arranging their prism grooves to run at right angles to each other, the moire produced due to interference of the prism sheet with the pixel can be completely eliminated, and this is preferred.

The entire disclosure of each and every foreign patent application from which the benefit of foreign priority has been claimed in the present application is incorporated herein by reference, as if fully set forth.

What is claimed is:

1. A liquid crystal display device, comprising:
   a liquid crystal display element, and
   a backlight structure for irradiating the liquid crystal display element,
   wherein the backlight structure includes at least two prism sheets having a large number of fine prism grooves on the liquid crystal display element-side surface,
   the angle between the groove direction of the prism groove of the two prism sheets and the repeating direction of pixels in the liquid crystal element is 4 to 86°,
   the two prism sheets are disposed by arranging the groove directions of prism grooves to run at right angles to one another, and
   a light diffusing film is provided between said two prism sheets and the liquid crystal element, the light diffusing film comprising a thermoplastic resin as the main component and containing, in the thermoplastic resin, at least one kind of a light-transmitting particle having an average primary particle diameter of 3 to 10 μm,
   wherein the absolute value of the refractive index difference between the thermoplastic resin and the light-transmitting particle is from 0.01 to 0.06,
   one surface has a concavoconvex shape, the total haze value is from 15 to 30%, the internal haze value is from 5 to 25%, the surface haze value is from 5 to 20%, and the average film thickness is from 20 to 200 μm.

2. The liquid crystal display device having the light diffusing film as claimed in claim 1, wherein the total haze value is from 20 to 30%, the internal haze is from 10 to 20%, and surface haze is from 10 to 20%.

3. The liquid crystal display device having the light diffusing film as claimed in claim 1, wherein the absolute value of the refractive index difference between the thermoplastic resin and the light-transmitting particle is from 0.01 to 0.03.

4. The liquid crystal display device having the light diffusing film as claimed in claim 1, wherein the average primary particle diameter of the light-transmitting particle is from 5 to 8 μm.

5. The liquid crystal display device having the light diffusing film as claimed in claim 1, wherein the arithmetic average roughness Ra and the average spacing between peaks over the evaluation length Sm, based on JIS B0601, of the surface concavoconvex shape satisfy the following (formula 1) and (formula 2), respectively:

$$0.10 \text{ μm} \leq Ra \leq 0.30 \text{ μm} \tag{formula 1}$$

$$50 \text{ μm} \leq Sm \leq 200 \text{ μm} \tag{formula 2}.$$

6. The liquid crystal display device having the light diffusing film as claimed in claim 1, wherein the arithmetic average roughness Ra and the average spacing between peaks over the evaluation length Sm, based on JIS B0601, of the surface concavoconvex shape satisfy the following (formula 1') and (formula 2'), respectively:

$$0.16 \text{ μm} \leq Ra \leq 0.24 \text{ μm} \tag{formula 1'}$$

$$60 \text{ μm} \leq Sm \leq 130 \text{ μm} \tag{formula 2'}.$$

7. The liquid crystal display device having the light diffusing film as claimed in claim 1, wherein the thermoplastic resin is a cellulose ester.

8. The liquid crystal display device having the light diffusing film as claimed in claim 1, wherein the light diffusing film has a region extending over an entire surface thereof and which is substantially absent of the light-transmitting particle having an average primary particle diameter of 3 to 10 μm, and the region has a thickness of 5 to 30 μm in the thickness direction from the surface having concavoconvex shape.

9. The liquid crystal display device having the light diffusing film as claimed in claim 8, wherein the light-transmitting particle having an average primary particle diameter of 3 to 10 μm is substantially absent in the region of 0 to 20 μm in the thickness direction from the surface opposite to the surface having concavoconvex shape.

10. The liquid crystal display device having the light diffusing film as claimed in claim 1, which is used for a polarizing plate protective film on the backlight side of the liquid crystal display device.

11. A polarizing plate having a polarizing film and a protective film provided on at least one side of the polarizing film, wherein the protective film is the light diffusing film of the liquid crystal display device as claimed in claim 1.

12. A method for producing the light diffusing film of the liquid crystal display device as claimed in claim 1, comprising simultaneously or sequentially casting, in order, on a support to form a film:

a light-transmitting particle-containing dope A containing at least one kind of a thermoplastic resin and at least one kind of a light-transmitting particle having an average primary particle diameter of 3 to 10 μm, wherein the absolute value of the refractive index difference between the thermoplastic resin and the light-transmitting particle is from 0.01 to 0.06, and a surface profile-adjusting dope B containing at least one kind of a thermoplastic resin and substantially free from a particle having a particle diameter of 1 μm or more, the surface profile-adjusting dope being lower in the concentration of the thermoplastic resin than the light-transmitting particle-containing dope.

13. The production method of the light diffusing film of the liquid crystal display device as claimed in claim 12, wherein a dope C containing at least one kind of a thermoplastic resin and substantially free from a particle having a particle diameter of 1 μm or more, the light-transmitting particle-containing dope A and the surface profile-adjusting dope B are, in order, simultaneously or sequentially cast on a support to form a film.

* * * * *